Nov. 13, 1951     T. G. BROWN     2,574,616
SPEED DECELERATING INDICATOR FOR MOTOR VEHICLES
Filed March 5, 1948
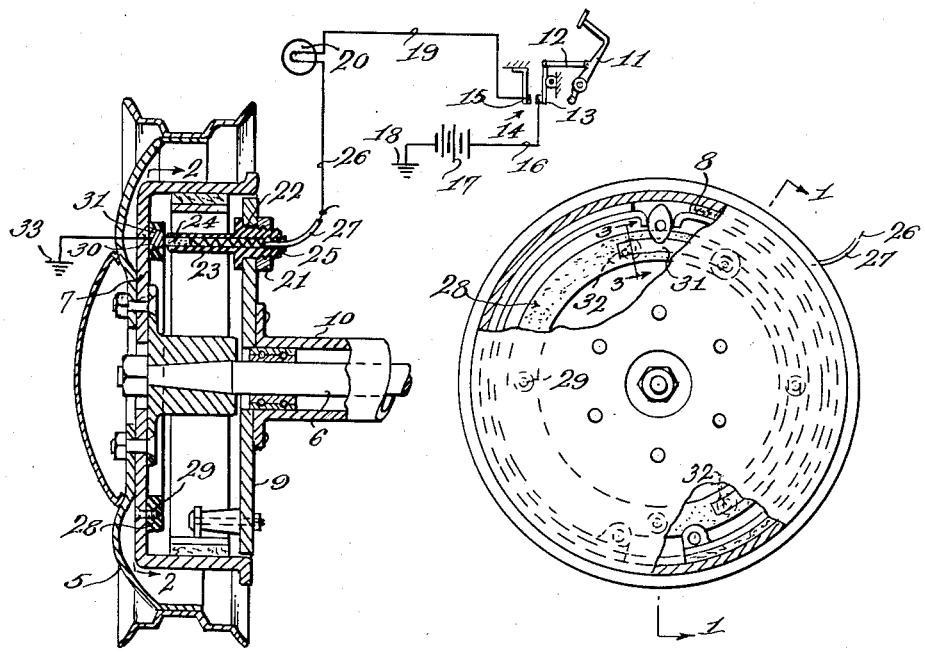
Fig. 1
Fig. 2
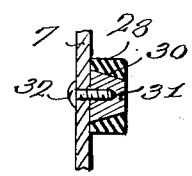
Fig. 3
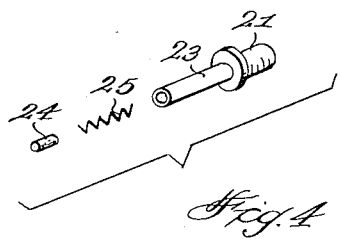
Fig. 4
Inventor
Theodore G. Brown
By John N. Randolph
ATTORNEY Patented Nov. 13, 1951

2,574,616

UNITED STATES PATENT OFFICE 2,574,616

SPEED DECELERATING INDICATOR FOR MOTOR VEHICLES

Theodore G. Brown, Sunnyvale, Calif.

Application March 5, 1948, Serial No. 13,287

2 Claims. (Cl. 200—28)

1

This invention relates to an improved construction of stopping signal for motor vehicles and more particularly aims to provide an illuminated signal which will indicate to drivers of vehicles to the rear the approximate rate of deceleration of a vehicle and which will accordingly enable such drivers to more accurately determine the extent that they must decelerate their own vehicles.

Conventional stop lights are illuminated by the closing of a switch when the brake pedal is depressed. However, the illuminated warning signal thus afforded offers no indication as to how rapidly the signaling vehicle is being decelerated and as many vehicle drivers have defective or poor depth perception, collisions frequently result from drivers of following vehicles not realizing how rapidly the signaling vehicle is being decelerated or that they are rapidly closing the gap between their vehicle and the decelerating vehicle.

Accordingly, it is the primary object of the present invention to provide a simple switch which will be interposed in the conventional stop light circuit of a motor vehicle and by means of which the approximate rate of deceleration will be indicated to drivers of following vehicles to enable them to more accurately determine how rapidly they must decelerate to prevent colliding with the signaling vehicle.

Various other objects and advantages of the invention will hereinafter become more fully apparent from the following description of the drawing, illustrating a presently preferred embodiment thereof, and wherein:

Figure 1 is a vertical sectional view of a rear vehicle wheel and associated parts with the invention applied thereto;

Figure 2 is a sectional view, partly broken away, taken substantially along a plane as indicated by the line 2—2 of Figure 1 and showing the brake drum of the wheel and with the invention applied thereto;

Figure 3 is a radial sectional view taken substantially along a plane as indicated by the line 3—3 of Fig. 2 and on an enlarged scale, and Figure 4 is an exploded perspective view of a part of the invention.

Referring more specifically to the drawing wherein one preferred application of the invention is disclosed, for the purpose of illustrating a simple embodiment of the invention, the numeral 5 designates a conventional vehicle wheel shown mounted on a rear axle 6 which has a conventional brake drum 7 secured non-rotatably thereto for rotation therewith and with the wheel 5. The brake of the wheel 5 also includes the usual brake shoes 8 and the annular brake housing wall 9 which combines with the brake drum 7 for enclosing the brake shoes 8 and which is non-rotatably supported by attachment to an end of the rear axle housing 10.

The numeral 11 designates a conventional brake pedal for the vehicle which is connected by a link 12 to a pivotally mounted switch element 13 forming a part of a switch, designated generally 14 which also includes a fixed contact member 15. It will be understood that the switch 14 is intended only to illustrate one conventional type of stop light switch for actuation by a brake pedal and any conventional type of switch for this purpose may be utilized. The switch contact 13 is connected by a conductor 16 to the positive side of a source of electric current, such as a storage battery 17 of the vehicle which is grounded at 18 to the vehicle frame in a conventional manner and a conductor 19 connects the stationary switch contact 15 to the positive side of a lamp bulb 20 forming the stop light which in conventional applications to motor vehicles is energized when the brake pedal 11 is depressed moving the contact 13 to circuit closing engagement with the contact 15. The brake pedal 11 in its normal position of Figure 1 retains the contact 13 out of engagement with the contact 15 and so that the switch 14 is in a circuit interrupting position. The parts previously described are all of conventional construction and constitute no part of the invention, hereinafter to be described.

The rate of deceleration indicator, constituting the invention, includes a bushing 21 formed of insulating material which is mounted in an opening 22 of the brake housing 9 and through which extends a tube 23. A brush or conductor element 24 is reciprocally mounted in the inner end of the tube 23 which is disposed within the brake housing and is urged toward a projected position with respect to said inner end preferably by an expansion spring 25, contained within the tube 23. An electrical conductor 26, preferably contained within the tubing of electrical insulating material 27, has one end thereof secured in the outer end of the tube 23 and in electrical contact therewith and said conductor 26 and its insulator 27 may function to form a limiting stop for the outer end of the spring 25. The opposite end of the conductor 26 connects with the negative side of the lamp bulb 20. A ring member 28 of insulating material is secured to the inner side of the radial wall of the brake drum 7 by fastenings 29 and is provided with an opening 30 which extends around a portion thereof and which extends therethrough from the side of the ring member 28 which abuts against the brake drum wall to the opposite, exposed side. As best seen in Figure 3, the opening 30 is preferably tapered toward its outer side for accommodating an arcuate strip 31 of electrical conductor material which is of tapered cross section to fit snugly within said opening 30 and which extends approximately one-half the distance around the ring 28 and from end-to-end of the opening 30 thereof, although the arcuate length of the opening 30 and strip 31 may be varied as desired, as will hereinafter become more fully apparent. Electrical conductor strip 31 is secured to the radial wall of the drake drum 7 by fastenings 32 and is retained thereby in electrical contact therewith and as clearly illustrated in Figures 1 and 3, the exposed face of the strip 31 is disposed substantially flush with the corresponding, exposed face of the ring 28 and the electrical conductor brush or contact member 24 is yieldably urged into engagement with either the electrical insulating ring 28 or said conductor segment 31.

Accordingly, from the foregoing it will be readily apparent that when the switch 14 is closed and the conductor brush element 24 is in contact with the conductor strip 31 that the electric circuit of the stop lamp 20 will be grounded through the conductor 26, tube 23, brush conductor 24, conductor strip 31, brake drum 7 and axle 6 to the vehicle frame as indicated by the ground 33. On the other hand, when the brush element 24 is in contact with the insulator ring 28 between the ends of the conductor strip 31, the lamp bulb 20 will not be grounded and accordingly will not be energized even though the switch 14 is closed. Likewise, when the switch 14 is open the stop lamp 20 will not be energized regardless of the position of the brush contact 24 with respect to the conductor strip 31.

It will also be readily apparent that the electrical insulating ring 28 and conductor strip 31 will rotate with the brake drum 7 and rear wheel 5 so that when the brake 11 is applied for closing the switch 14 the stop lamp 20 will be intermittently energized for approximately one-half of each revolution of the wheel 5 to produce a visual flashing signal and as the vehicle with which the parts are associated is decelerated the speed of rotation of the wheel 5 will decrease in ratio to the speed of deceleration of the vehicle so that the rate at which the visual signal 20 will flash will be accordingly slowed down thereby readily indicating to operators of the following vehicles the extent to which the signaling vehicle is being decelerated by the variation in the rate that the bulb 20 is flashed.

Obviously, various changes may be resorted to in the construction and arrangement of the parts constituting the invention or in the manner of attaching the invention to a rotatable part of the vehicle so long as a rotatable part of the vehicle is utilized which rotates at a speed conforming in ratio to the speed of translational motion of the vehicle, and various other modifications and changes are likewise contemplated may obviously be resorted to without departing from the spirit or scope of the invention as hereinafter defined by the appended claims.

I claim as my invention:

1. A visual translational motion speed decelerating indicator for motor vehicles, comprising a switch adapted to be interposed in an electric signaling circuit of a motor vehicle for intermittently interrupting the signal circuit, said switch including a stationary contact and a revolving contact, and means driving the revolving contact at a speed at ratio to the translational motion of the vehicle, said stationary contact consisting of a brush element disposed perpendicular to the plane of rotation of the revolving contact and engaging a limited portion thereof, said revolving contact consisting of a strip of electrical conducting material defining approximately a half circle and being in engagement with the stationary contact throughout approximately one-half of each revolution of the driving means whereby the time intervals that the signal circuit is maintained energized and de-energized by the switch will vary in direct ratio to the speed of translational motion of the vehicle.

2. A visual translational motion speed decelerating indicator for motor vehicles, comprising a switch adapted to be disposed in a stop light circuit of a motor vehicle, said switch including a stationary contact and a grounded approximately semi-circular rotary contact, said stationary contact comprising a brush element disposed substantially perpendicular to the plane of rotation of the rotary contact, said rotary contact being adapted to be secured to a ground engaging wheel of the vehicle and being in engagement with the stationary contact during approximately one-half of each revolution of the wheel whereby the time intervals during which the switch is in circuit closing and circuit interrupting positions will vary in direct ratio to the translational motion speed of the vehicle.

THEODORE G. BROWN.

REFERENCES CITED

The following references are of record in the file of this patent:

UNITED STATES PATENTS

| Number | Name | Date |
|---|---|---|
| 564,168 | Tower | July 14, 1896 |
| 1,305,649 | Freytag | June 3, 1919 |
| 1,311,135 | Olds | July 29, 1919 |
| 1,519,566 | Tiefenthaler | Dec. 16, 1924 |
| 1,530,941 | Higgins | Mar. 24, 1925 |
| 1,652,499 | Miller | Dec. 13, 1927 |
| 1,761,225 | Newton | June 3, 1930 |
| 1,851,498 | Doane | Mar. 29, 1932 |
| 2,318,313 | House | May 4, 1943 |